United States Patent [19]
Hardin

[11] Patent Number: 5,727,621
[45] Date of Patent: Mar. 17, 1998

[54] GEOTHERMAL ENERGY MEANS AND PROCEDURE

[75] Inventor: James R. Hardin, Indianapolis, Ind.

[73] Assignee: Geotech, LLC (a non-incorporated company), Indianapolis, Ind.

[21] Appl. No.: 578,327

[22] Filed: Dec. 26, 1995

[51] Int. Cl.⁶ .......................... F24D 11/00; F24D 12/00; F24J 3/08
[52] U.S. Cl. .......................... 165/45; 62/DIG. 22
[58] Field of Search .......................... 165/45; 62/238.6, 62/238.7, DIG. 22

[56] References Cited

U.S. PATENT DOCUMENTS

| | | | |
|---|---|---|---|
| 3,550,677 | 12/1970 | Knowles | 165/108 |
| 4,782,888 | 11/1988 | Bardenheier | 165/210 |

FOREIGN PATENT DOCUMENTS

| | | | |
|---|---|---|---|
| 2299603 | 8/1976 | Germany | 62/238.6 |
| 2834442 | 2/1980 | Germany | 62/238.6 |
| 2846613 | 5/1980 | Germany | 237/13 |

*Primary Examiner*—Allen J. Flanigan
*Attorney, Agent, or Firm*—Robert A. Spray

[57] ABSTRACT

A geothermal energy installation and system, in which the field of potable water is utilized by a secondary conduit system to route potable water from an inlet in the user's line coming from the potable water field but upstream of the user's meter, through the heat exchanger equipment of a user, and back to the field at a point upstream of the final treatment processing stage of the field. Thus, the thermal energy of the water of the field is utilized without adding the cost of the volume of potable water use by the user, and is re-processed if somehow contaminated in the secondary conduit systems; and although the secondary conduit system delivers water back to the field at a changed temperature, depending upon the heat exchanger effect, the relatively large volume of water of the potable water field assures that the returned water does not even substantially alter the temperature of the potable water field.

6 Claims, 1 Drawing Sheet

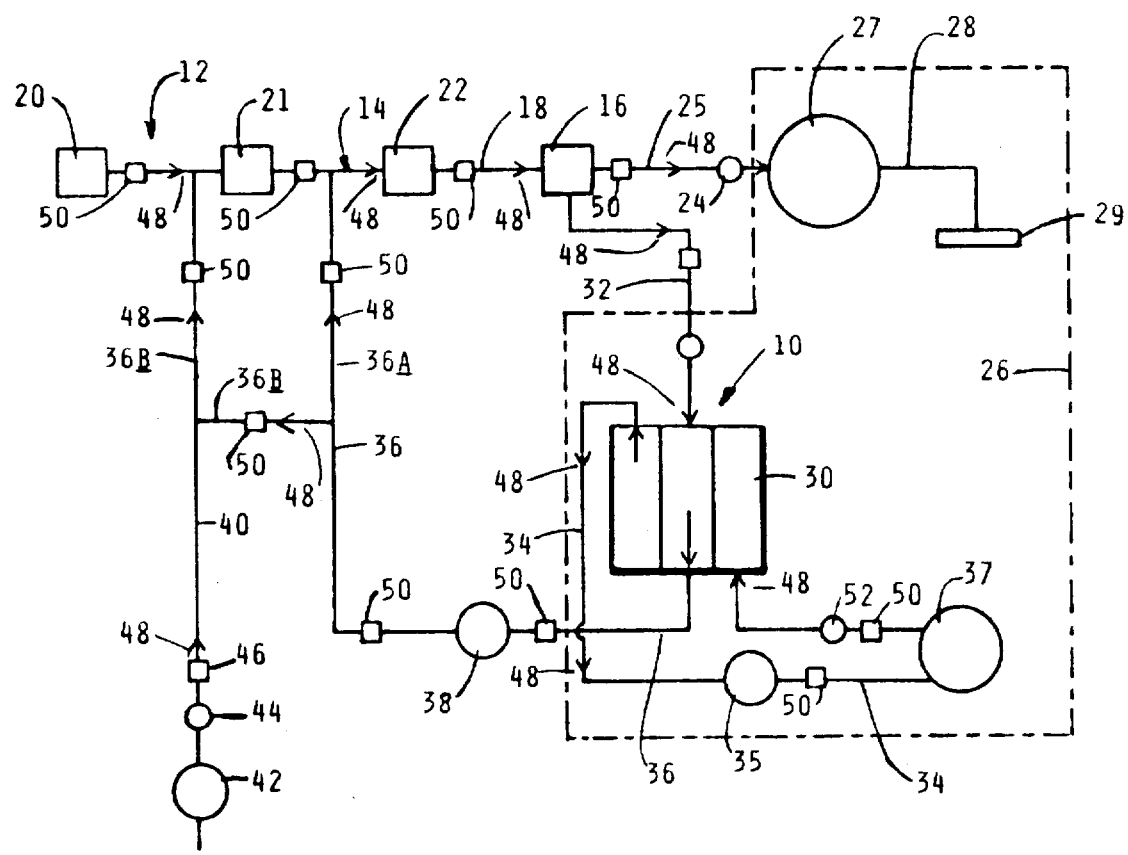

005,727,621

GEOTHERMAL ENERGY MEANS AND PROCEDURE

I. FIELD AND USEFULNESS OF THE INVENTION, BRIEFLY

The present invention relates to a provision and utilization of geothermal energy.

More particularly, the concepts add to the state of the water delivery art a valuable system of providing a secondary conduit system which leads from and subsequently back to the conduit system of a potable water field, after passing through heat exchanger components of the user's equipment, but bypassing the user's volume-monitoring meter.

This enables the water company to supply, and the user to use, the thermal energy of a huge amount of potable water in a non-consumable procedure, but without using the water itself, and with the immense volume of the potable water field providing the geothermal effect of a huge thermal energy source or a huge heat sink; whereas, heretofore, the water for heat exchanger use has been from an expensive and wasteful use of potable water charged as being consumable potable water and for a corresponding sewer charge of carry off of potable water discharge.

II. PROBLEMS AND OTHER FACTORS INHERENT IN GEOTHERMAL INSTALLATIONS

Long known as to geothermal installations is the fact that although water usage can be classified as to value and cost as of two different types, no installation known to the inventor provides a system providing a logical supply differential as here set forth by which the two different usages by the same consumer may be differentially priced, especially in a system providing other advantages.

More particularly, in a system of the present invention, a difference in type of water use is not only realized to exist, but is a significant factor of differential pricing, depending upon the consumable nature of the use. That is, water use is said to be "consumable" in such use as water for drinking, lawn sprinkling, bathroom usage, washing clothes, etc., whereas other water is said to be utilized in a "non-consumable" manner, as in heating systems, etc.

Further to designate the problem, the "open system" nature of a "consumable" water usage, in contrast to the "closed system" nature of a "non-consumable" usage, means that the former is more costly than the latter, yet the same network or field of circuitry has been used to supply both, and specifically, all the usage of both types is generally metered in an indiscriminate manner; but this indiscriminatory nature of metering both types of water use is not logically fair or realistic, because the water of a "closed" or "non-consumable" system of usage is not lost to a sewer or otherwise discharged, as is the water of an "open" system or "consumable" usage.

Thus, logically, the economics of charging by a water company, or of payment by a user, can be seen to logically require differentiation, for it may be readily perceived that the water in a closed circuit, passing through the field which is non-diminished as to volume, does not cost nearly as much to deliver.

Accordingly, the present invention deals with problems of delivery and differentiation of water supply types for cost purposes, and related considerations.

III. THE INVENTIVE SYSTEM AND PROCESS IN BRIEF SUMMARY

In carrying out the invention, with a system and process of a preferred embodiment, as a basic concept there is provided means for using potable water from the potable water field, in a novel secondary circuitry means.

The secondary conduit taps into the field upstream of any metering means, passes through the heat exchanger unit of a user's equipment for extraction of its thermal energy and returns water from that secondary conduit to the primary conduit means, achieving the energy benefit of the temperature of water in the field, but without having to pay for consumption of the water itself.

More particularly, the secondary circuitry means, although fed by potable water and leading through the heat exchanger component of a user's apparatus as in prior art systems, is provided with a return line by which the water, as changed in thermal energy by the heat exchanger, is returned to the primary water-supply line.

Preferably, that return is at a location upstream of the final treatment stage, thus assuring its treatment and quality.

Optionally, the return line from the heat exchanger is led to its connection to the primary water line at a point upstream of one of the preliminary filter and/or cleaner stages, especially in certain industrial uses in which a significant amount of contamination is introduced into the secondary water-conduit means. But wherever that secondary line is connected to the primary line, the entirety of the recycled potable water is restored to the approximate temperature of the potable water field, regardless of its temperature change incident to its change in its secondary circuit travel, because of the much larger volume of water in the potable water field than in the secondary energy circuit.

Other details are included in the more detailed description.

IV. PRIOR ART CAPABILITY AND MOTIVATIONS, AS HELPING TO SHOW PATENTABILITY HERE

Even in hindsight consideration of the present invention to determine its inventive and novel nature, it is not only conceded but emphasized that the prior art had many details usable in this invention, but only if the prior art had had the guidance of the present concepts of the present invention, details of both capability and motivation.

That is, it is emphasized that the prior art had/or knew several particulars which individually and accumulatively show the non-obviousness of this combination invention. E.g., (a) Hydraulic circuitry, and specifically water conduit systems and networks, have long been in worldwide use;

(b) The nature of ground water deposits of various types, their practically inexhaustable quantity, their nearly uniform mean temperatures, etc., have been long known;

(c) The installation of water conduit systems has been already done in many locations;

(d) The geothermal effect of water as caused to pass through heat exchanger components of various installations has long been used;

(e) The ease of tooling for the present invention has surely given manufacturers ample incentive to have made modifications for commercial competitiveness in a competitive industry, if the concepts had been obvious;

(f) The prior art has always had sufficient skill to make many types of water conduit systems and features, more than ample skill to have achieved the present invention, but only if the concepts and their combination had been conceived;

(g) Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieve this advantageous invention;

(h) The details of the present invention, when considered solely from the standpoint of construction, are exceedingly simple, basically water conduit and related hardware available for various hydraulic installations; and the matter of simplicity of construction has long been recognized as indicative of inventive creativity;

(i) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and (j) The predictable benefits from a novel geothermal installation and procedure having the features of this invention would seem sufficiently high that others would have been working on this type of installation, but only if the concepts which it presents had been conceived.

Accordingly, although the prior art has had capability and motivation, amply sufficient to presumably give incentive to the development of an installation and procedure according to the present invention, the prior art did not suggest this invention.

V. PRIOR ART AS PARTICULAR INSTANCES OF FAILURE TO PROVIDE THIS NOVEL INSTALLATION AND PROCEDURE

In view of the general economic advantages, ecological advantages, etc., of the present invention, it may be difficult to realize that the prior art has not conceived of the combination purpose and achievement of the present invention, even though water conduits and systems of conduits are relatively common and widespread installations, and the water supply industry, like other industries, can use improvements in various aspects. Further, persons knowledgable with respect to water field circuitry surely include an uncountable multitude of persons, at least of sufficient experience, skill, etc., that the present invention would have been desired and attempted long ago, but only if its factors and combination-nature had been obvious.

The consideration of the nature of the present invention concepts may be helped by a summarized consideration of the prior art as known to the inventor; however, as water conduit uses and installations are so well known and universally known and used, merely generalized reminders as to them as diverse and well-known prior art seem sufficient.

That is, water conduit installations have been known and used, and surely could have been modified toward the present invention for many scores of years if the present improvement had been obvious.

Further, as to water conduit systems and geothermic functioning as a function of capability, nothing is here asserted to be novel; and, in contrast, the concepts of the present invention provide the building upon the principal nature and function of water conduit systems, rather than any modification of their function.

Various types of water conduit installations are of course here conceded, but the general nature of prior art water conduit systems does not provide the overall combination of features of the present invention. Such systems known to the inventor are so-called heat pump installations, as the least remote from the present invention.

VI. SUMMARY OF THE PRIOR ART'S LACK OF SUGGESTIONS OF THE CONCEPTS OF THE INVENTION'S COMBINATION

In spite of all such factors of the prior art knowledge and use, the problem here solved awaited this inventor's consideration, ideas, and creativity. More particularly, as to the novelty here of the invention as considered as a whole, a consideration of the prior art uses and needs helps show its contrast to the concepts, and emphasizes the advantages, novelty, and the inventive significance of the present concepts as are here shown, particularly as to utility and economy of use as detailed herein, as to apparatus and a procedure.

Moreover, prior art systems and installations, such as heat pumps, as known to this inventor, which could possibly be adapted for this duty, fail to show or suggest the details of the present concepts as a combination; and a realistic consideration of the prior art's differences from the present concepts of the overall combination may more aptly be described as teaching away from the present invention's concepts, in contrast to suggesting them, even as to a hindsight attempt to perceive suggestions from a backward look into the prior art, especially since the prior art has long had much motivation as to details of the present invention and to its provisions.

And the existence of such prior art knowledge and related ideas embodying such various features is not only conceded, it is emphasized; for as to the novelty here of the combination, of of the invention as considered as a whole, a contrast to the prior art helps also to remind of needed improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

And the prior art's lack of an invention of an economical apparatus achieving the economy and ecology characteristics and other advantages of the present invention, which are goals only approached by the prior art, must be recognized as being a long-felt need.

Accordingly, the various concepts and components are conceded and emphasized to have been widely known in the prior art as to various installations; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

VII. BRIEF DESCRIPTION OF THE DRAWING

The above description of the novel and advantageous invention is of somewhat introductory and generalized form. More particular details, concepts, and features are set forth in the following and more detailed description of an illustrative embodiment, taken in conjunction with the accompanying Drawing, which is of quite schematic and flow diagrammatic nature for showing the inventive concepts; and in the Drawing the water-conduit is for water flow generally from left to right, except as the secondary circuit is described in detail.

VIII. DETAILED DESCRIPTION OF ILLUSTRATIVE EMBODIMENT

As shown in the Drawings, the inventive concepts provide and achieve a novel advantageous geothermal energy means 10.

The description of the geothermal energy means 10 is here set forth in its use, i.e., for association with a primary water-supply means 12. The primary water supply means 12 is shown as including conduit means 14; and by that water-conduit means 14 potable water is supplied to a field of premises 16 which are to be supplied as participants of the potable water from the water-supply means 12.

The water for making up the potable water in the primary water-conduit means 14 is supplied to the use-field 16 of customers' premises by a primary input line 18 which operatively leads from whatever is to be used as the associated ground water source 20 to supply potable water to the premises of the field 16.

The water source 20 of course depends upon the site and availability, such as underground well, a pond or stream, etc.

Also as typical of prior art supply, there is provided one or more water-treatment means here shown as a preliminary cleansing or filtering means 21 and a final treatment 22, they being operatively in the primary water-conduit means 14.

Also as per the prior art there is a meter means 24, which measures the volume of water being supplied in the particular customer's line 25 from the potable water supply delivered from the field 16 to a user's premises 26.

The line 25 is shown as leading to a potable water usage indicated as element 27 by which potable water after use is led by line 28 to waste indicator 29.

The waste indicator 29 is meant to designate whatever one or more are the loss passages from the particular user's discharge lines 28 which discharge dirty or wasted water, evaporation of lawn sprinkling, etc.

Also as a part of prior art water supply systems, many user's field 16 components operatively includes a heat exchanger means 30, for whatever happens to be one or more uses of water which utilize a heat exchanger means.

It is with respect to the heat exchanger means 30 and its advantageous use that the present concepts depart from the prior art, providing many advantages set forth herein.

More particularly, the geothermal energy means 10 associated with the heat exchanger means 30 comprises the improvement of a secondary water-conduit means 32 which is connected not to waste 29 as in prior art systems but instead to the field 16 of potable water upstream of its meter means 24, for a re-circulating concept which avoids most of the cost of potable water which is supplied to the premises as drinkable, but not necessarily so, in situations in which it is used only for its thermal energy value or purpose.

That is, the secondary water-conduit means 32 operatively passes through the heat exchanger means 30 of the user's premises 26 in heat transfer relation to the tertiary conduit 34, which represents the closed loop of the liquid which in the heat exchanger 30 is used to achieve a heat transfer relationship with the water coming to the heat exchanger 30 from line 32.

(That tertiary conduit 34's water, after leaving the heat exchanger means 30, will then pass through the one or more customer usages of thermally-affected water in line 34 as is indicated in the Drawings by designation 37 as pumped by pump 35.)

The primary water flowing through secondary circuit line 32 and the heat exchanger means 30 is shown as traveling by quaternary line 36 through a pump 38 and is shown connected to the primary water-conduit means 14, preferably as shown just upstream of the final treatment means 22, so as to assure the cleansing of whatever contamination may have occurred in lines 32 and 36.

The secondary water-conduit means 32/36 is shown as connected to the primary water-conduit means 14 of potable water upstream of its treatment means 22, assuring cleanliness; and preferably, with the primary water-conduit means 14 containing at least a first treatment means 22 and a second treatment means 21 (the first treatment means 22 being operatively downstream of the second treatment means 21), even more cleaniness is assured.

That is, preferably, the secondary water-conduit means 32/36 is provided to have at least two optionally usable branch conduit means 36A and 36B, a first one 36A of which branch conduit means is connected to the primary water-conduit means 14 operatively between the said first 22 and second 21 treatment means, and another of the branch conduit means 36B is operatively connected to the primary water-conduit means 14 upstream of the second treatment means 21, for assuring even more positiveness of filtering/cleaning.

Additional circuitry may of course be provided. Thus, e.g., an additional input circuit 40 is shown as providing additional water, by attachment to the downstream portion of line 36B to the water supply conduit means 14; and the circuit 40 is shown with a pump 42, a meter 44 and a valve 46.

The direction of water flow throughout is indicated by arrowheads 48.

Other valves 50 including check valves are illustrated diagrammatically in the various circuit lines as components 50.

Meters may be used where desirable, such as at 52 in tertiary circuit 34, although the only meter particularly significant in present concept is the meter 24 which is downstream of the secondary circuit 32 and the return circuit 36.

IX. SUMMARY OF COMPONENTS AND OPERATIONAL DETAILS, AND THEIR ADVANTAGES

The present invention as detailed herein has advantages in both concept and in component parts and features; for in contrast to other systems known to the inventor as to the prior art mentioned, the invention provides advantageous features which should be considered, both as to their individual benefit, and to whatever may be considered to be also their synergistic benefit toward the invention as a whole. Such features include:

(a) Achieve the return of ground water temperature to large volumes of water which have gone through heat exchangers of auxiliary equipment;

(b) Avoid the expense of building, operating and maintaining water towers or other structures through which water would have to be circulated, as a heat sink procedure, in order to overcome the heating effect of certain uses, or to otherwise change water temperature by causing water to be recycled into the relatively large water volume of the potable water field;

(c) Accommodate the provision of auxiliary lines such as optional alternate return lines to a point upstream of a preliminary filter treatment;

(d) Provide more profit to a water company and/or lesser prices to users;

(e) Assure that recycled water is as pure as before its heat-exchanger routings;

(f) Achieve the economic benefit of ground source energy content of potable water and water field;

(g) Extra economic benefit of water after passing through industrial processes, heat pumps, chillers, and other heat exchanger procedures achieving energy transfer;

(h) Minimize investment in special geothermal or ground source wells or fields of specific users;

(i) Provide more economical utilization of water fields, particularly advantageous for users who would have limited access to ground source areas;

(j) Minimize high initial installation cost for using ground source energy for geothermal use; and (k) Significant reduction in potable water cost of portions used in heat-exchanger use, since the recycled water may be returned to particular latter stages of the water treatment facilities.

These and similar particulars of advantageous features, all quite related, are functions of a basic concept of various details relating to and emanating from applicant's concept of utilizing water from the potable water field, through heat exchanger components of heat-transfer apparatus, and recycling that water, changed in energy but not in volume, back to one of the water-treatment stages by which potable water is produced in the installation.

X. CONCLUSION AS TO INVENTIVE COMBINATION

It is thus seen that a water system or conduit assembly, constructed and used according to the combination of inventive concepts and details herein set forth, provides novel concepts of a desirable and usefully advantageous installation and procedure, yielding advantages which are and provide special and particular advantages when used as herein set forth.

In summary as to the nature of the overall and advantageous concepts, their novelty and inventive nature is shown by novel features of concept and construction shown here in advantageous combination and by the novel concepts hereof not only being different from all the prior art known, even though other water systems have been known and used for scores of years, but because the achievement is not what is or has been suggested to those of ordinary skill in the art, especially realistically considering this as a novel combination comprising components which individually are similar in nature to what is well known to most all persons, surely including most of the many technicians and professionals of water-delivery systems and apparatus for a great number of years, throughout the entire world. No prior art component or element has even suggested the modifications of any other prior art to achieve the particulars of the novel concepts of the overall combination here achieved, with the special advantages which the overall combination system provides; and this lack of suggestion by any prior art has been in spite of the long worldwide use of water delivery systems, public and privately operated.

The differences of concept and construction as specified herein yield advantages over the prior art; and the lack of this invention by the prior art, as a prior art combination, has been in spite of this invention's apparent simplicity of the construction once the concepts have been conceived, in spite of the advantages it would have given, and in spite of the availability of all the materials, to all persons of the entire world, and the invention's non-technical and openly-visible nature.

Quite certainly this particular combination of prior art details as here presented in this overall combination has not been suggested by the prior art, this achievement in its particular details and utility being a substantial and advantageous departure from prior art, even though the prior art has had somewhat similar systems for numbers of years. And particularly is the overall difference from the prior art significant when the non-obviousness is viewed by a consideration of the subject matter of this overall device as a whole, as a combination integrally incorporating features different in their combination from the prior art, in contrast to merely separate details themselves, and further in view of the prior art not achieving particular advantages here achieved by this combination.

Accordingly, it will thus be seen from the foregoing description of the invention according to these illustrative embodiments, considered with the accompanying drawings, that the present invention provides new and useful concepts of a novel and advantageous system and procedure, possessing and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments, or form or arrangement of parts herein described or shown.

The invention claimed is:

1. A geothermal energy means, for association with a primary water-supply means including a primary water-conduit means by which potable water is supplied to a field of premises which are to be supplied as participants of the potable water from said water-supply means, the water for making up the potable water in the primary water-conduit means being supplied to the field of premises by a primary input line operatively leading from an associated ground water source to the premises of said field, and there being a line from the potable water supply from said field to a user's premises, there being water-treatment means operatively in said primary water-conduit means, there being a meter means operatively in the line from the potable water supply from said field to a user's premises, a user's field operatively including heat exchanger means, the geothermal energy means associated therewith comprising the improvement of a secondary water-conduit means connected to the said field of potable water upstream of the meter means of the user's field, thereby providing that the user's meter means will show the amount of water used by the user's geothermal means;

and the secondary water-conduit means operatively passing through the heat exchanger means of the user and is operatively connected to the primary water-conduit means.

2. A geothermal energy means as set forth in claim 1, in a combination in which the secondary water-conduit means is connected to the primary water-conduit means of potable water upstream of its treatment means.

3. A geothermal energy means as set forth in claim 1, in a combination in which the primary water-conduit means contains at least a first treatment means and a second treatment means, the first treatment means being operatively downstream of the second treatment means, in a combination in which the secondary water-conduit means is provided to have at least two optionally usable branch conduit means, one of which branch conduit means is connected to the primary water-conduit means operatively between the said first and second treatment means, and another of the branch conduit means is operatively connected to the primary water-conduit means upstream of the second treatment means.

4. A geothermal energy process, for association with a primary water-supply means including a primary water-conduit means by which potable water is supplied to a field of premises which are to be supplied as participants of the potable water from said water-supply means, the water for making up the potable water in the primary water-conduit means being supplied to the field of premises by a primary input line operatively leading from an associated ground water source to the premises of said field, and there being a line from the potable water supply from said field to a user's premises, there being water-treatment means operatively in said primary water-conduit means, there being a meter means operatively in the line from the potable water supply from said field to a user's premises, a user's field operatively including heat exchanger means, the geothermal energy process associated therewith comprising the improvement of a secondary water-conduit means connected to the said field of potable water upstream of the meter means of the user's field, thereby providing that the user's meter means will show the amount of water used by the user's geothermal means;

and the secondary water-conduit means operatively passing through the heat exchanger means of the user and is operatively connected to the primary water-conduit means.

5. A geothermal energy process as set forth in claim 4, in a combination of the secondary water-conduit means being connected to the primary water-conduit means of potable water upstream of its treatment means.

6. A geothermal energy process as set forth in claim 4, in a Combination in which the primary water-conduit means contains at least a first treatment means and a second treatment means, the first treatment means being operatively downstream of the second treatment means, in a combination in which the secondary water-conduit means is provided to have at least two optionally usable branch conduit means, one of which branch conduit means is connected to the primary water-conduit means operatively between the said first and second treatment means, and another of the branch conduit means is operatively connected to the primary water-conduit means upstream of the second treatment means.

* * * * *